United States Patent [19]

Prygoff

[11] 4,130,801

[45] Dec. 19, 1978

[54] AUDIO MESSAGE BROADCAST SYSTEM

[76] Inventor: Jack Prygoff, 1088 Rosedale Rd., North Woodmere, N.Y. 11581

[21] Appl. No.: 672,267

[22] Filed: Mar. 31, 1976

[51] Int. Cl.[2] .................... H04B 7/20

[52] U.S. Cl. .................... 325/4; 325/7; 325/48; 325/54; 179/15 BM; 179/15 BT

[58] Field of Search .................... 325/4, 6, 7, 47, 51, 325/54, 48; 179/15 R, 15 BM, 15 BT

[56] References Cited

U.S. PATENT DOCUMENTS

| | | | |
|---|---|---|---|
| 3,534,266 | 10/1970 | Halstead | 325/48 |
| 3,922,607 | 11/1975 | Wysong | 325/48 |

OTHER PUBLICATIONS

"Orbiting Relays", Electronics World, pp. 40–41, 79, Feb. 1968.

*Primary Examiner*—Robert L. Richardson

*Attorney, Agent, or Firm*—Samson B. Leavitt; Michael A. Leavitt

[57] ABSTRACT

The present invention provides for an audio message broadcasting system which includes a source of pre-recorded audio messages such as a tape player for producing an audio signal of approximately one thousand cycles. The signal is delivered to a microwave transmitting station via available cable for transmission over microwave channels to a microwave receiving station. The microwave receiving station is connected to an earth based transmitting station for transmitting the signal on a 6 GHz frequency carrier to an earth orbiting spin stabilized geostationary satelite for receiving the signal. The satelite carries a wideband receiver which translates the 6 GHz carrier to a 4 GHz carrier for downward transmission of the signal. An additional earth based receiving station is located remote from the earth based transmitting station, such as across the continental United States. From there the signal is transmitted via microwave channels to local FM radio broadcasting stations for transmission over subcarrier channels to subscriber receivers. The subscriber receivers are preferably located at retail or supermarket locations for in-store broadcast of the pre-recorded audio messages, which may take the form of commercial messages for in-store advertising.

8 Claims, 1 Drawing Figure

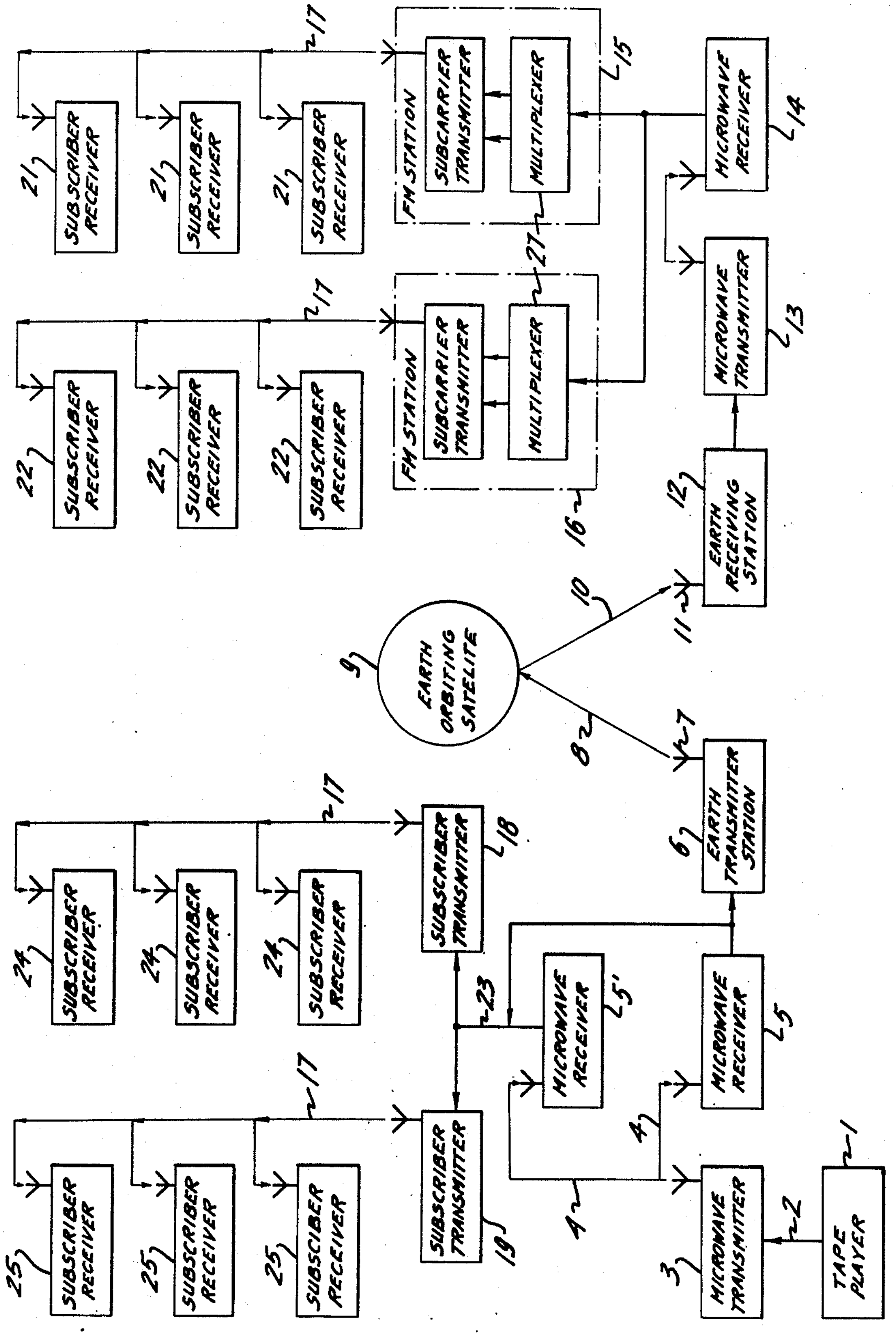
SUBSCRIBER RECEIVER
FM STATION
SUBCARRIER TRANSMITTER
MULTIPLEXER
MICROWAVE RECEIVER
MICROWAVE TRANSMITTER
EARTH RECEIVING STATION
EARTH ORBITING SATELITE
EARTH TRANSMITTER STATION
SUBSCRIBER TRANSMITTER
SUBSCIBER RECEIVER
TAPE PLAYER
1
2
3
4
5
5'
6
7
8
9
10
11
12
13
14
15
16
17
18
19
21
22
23
24
25
27

AUDIO MESSAGE BROADCAST SYSTEM

BACKGROUND OF THE INVENTION

This invention relates generally to the art of radio broadcasting audio signals, and more specifically, to a system for transmitting and receiving pre-recorded audio messages over predetermined subcarrier channels or sidebands for reception by selective receivers.

The use of subcarrier channels or selective sidebands for FM transmission to selective receiving stations has been in widespread use for sometime. Such systems have become popular for example, in broadcasting continuous music programs to subscribers of the system and who are provided with necessary receivers or adaptors so that the subcarrier channels or sideband frequencies may be received by the subscriber but not by other commercially available FM receivers. The use of such systems has become popular for the transmission of continuous music programs to such subscribers as restaurants, retail stores, supermarkets, etc. On such commercially available system which offers its service to subscribers known as Muzac TM offers the continuous music format to its subscribers.

Another such service known as Supermarket Network TM operated by Audio Media Corporation of Valley Stream, New York, provides the additional feature of broadcasting selected advertising messages at predetermined intervals to each of the subscribers. The desired advertising message can be pre-recorded on tape or audio disc and selectivey broadcast over the channels subscribed for.

In-store audio message advertising systems can be implemented by placing individual tape recording and public address systems connected to the tape recorders directly within each store for broadcasting the particular advertising messages. Such systems, however, require that each retail outlet (more typically supermarkets) be provided with the complete advertising programs on pre-recorded tapes or discs so that mass duplication of such tapes or discs would be required if it is desired that the advertising messages be broadcast in numerous locations. The use of a central broadcast station constitutes an advance in that the same advertising messages can be broadcast simultaneously to numerous locations over selected channels to subscribers of the service who are provided with specially equipped receivers. Although such systems have met with commercial success, the number of locations or consumers who can be reached by a broadcast from a single station is limited by the range of the local broadcast station. Accordingly, if it were to be desired to broadcast a particular advertising message to numerous supermarket receivers located either nationally or regionally throughout the United States, it would be necessary to duplicate the pre-recorded advertising messages and provide each local transmission station with the same message for individual transmission to the local receivers being serviced by that particular FM transmitter.

Coast-to-coast transmission of audio signals over existing private lines, through relay broadcast or cable transmission, are capable of delivering the desired advertising messages originating from a central taperecorded carrier. However, such systems are relatively expensive and require multiple line-of-sight repeater stations and switching centers. Such networks create potential trouble spots along a given transmission line and a possibility of transmission breakdown at a number of intermediate stations. Additionally, while such existing networks are capable of transmitting the desired messages over long distances, the quality of the transmitted signal is subject to localized transmission conditions.

It is accordingly one object of the present invention to provide a system by which selected advertising messages can be centrally recorded, centrally played-back and yet broadcast to a multitude of receivers regardless of location throughout the entire continental United States without the necessity of installing individual tape-playing and transmitting equipment at local broadcast stations.

A further and more specific object of the present invention is to provide a message broadcast system in which the pre-recorded messages can be broadcast to a multitude of receivers simultaneously over long range distances through the use of existing earth orbiting, spin stabilized, synchronous, geostationary, space satelite network systems.

Yet, another object of the present invention is to provide a system for broadcasting desired advertising messages over selective subcarrier channels to subscriber receivers simultaneously with a muted musical background.

Another general object of the present invention is to provide a system for transmitting audio messages to subscriber receivers by means which avoid the disadvantages of conventional land-line services through the use of existing earth orbiting satelite networks. Through the use of satelite transmission, the cost and quality of the signal transmitted is substantially unaffected by the distances of transmission involved and employ a minimum of relay transmission stations.

Yet, another object of the present invention is to provide an efficient and reliable means for carrying the desired message signals to and from the transmission stations for relaying signals to the earth orbiting satelite through the use of existing microwave channels.

Still, a further object of the present invention is to provide a system by which the selected advertising messages can be transmitted to regional receiver locations through the use of microwave channels so that while the same message is being broadcast via satelite between coast-to-coast locations, the message can be simultaneously broadcast via microwave channels to closer locations.

The above objects, features and advantages, along with other objects, features and advantages of the invention will become more apparent from the detailed description of the invention in connection with the accompanying drawings to be described more fully hereinafter.

SUMMARY OF THE INVENTION

The foregoing objects are generally accomplished by providing an audio message broadcast system comprising a source of pre-recorded audio messages and means for producing an audio signal corresponding to these messages; means connected to said source for transmitting said signal to an earth based transmitting station, means at said earth based station for upwardly transmitting said signal over a first frequency channel to an earth orbiting spin stabilized geostationary satelite for receiving said signal and for translating said first frequency channel to a second frequency channel for downward relay transmission from said satelite, an earth based station remote from said earth based transmitting station for receiving said signal carried on said second frequency carrier, means connected to said earth based receiving station for transmitting said signal to an FM radio broadcasting station, and means for transmitting said signal over subcarrier channels from said FM station to subscriber receiving stations for audio broadcast of said pre-recorded audio messages.

The foregoing system allows for coast-to-coast delivery of pre-recorded messages such as advertising or commercial messages to subscribers equipped with receivers for picking-up the subcarrier signals from the local FM stations without the disadvantages of multiple line-of-sight repeater and switching stations which create a number of potential trouble spots along a given transmission channel.

The use of commercially available satelite networks, to be described more fully hereinafter with respect to the description of the invention, provides exceptional quality of transmission outside of earth's environment or atmosphere thus limiting interference and avoiding multiple earth based potential trouble spots.

A further feature of the present invention is the provision of land based microwave transmitting means for transmitting the signal between the source and the earth based transmitting station. Additionally, means are provided for transmitting the signal over land based microwave channels between the earth based receiving station and the localized FM broadcasting stations for transmitting the signal over subcarrier channels to the subscriber receivers.

Further, to service subscribers who may not be located as far away as across the coast, regional FM broadcasting stations can be serviced by land based microwave channel transmission means without the necessity of satelite relay so that the same advertising message can be broadcast to subscriber receivers at both local FM broadcast stations and at remote locations via satelite.

The foregoing and other features of the audio message broadcast system of this invention are more fully described with reference to the annexed drawing.

BRIEF DESCRIPTION OF THE DRAWING

The sole FIGURE in the accompanying drawing is a block diagram illustrating the system of the present invention including the essential components thereof.

DESCRIPTION OF THE INVENTION

The system of the present invention employs any suitable means for storing pre-recorded advertising messages intended to be broadcast to the multitude of receiving stations located in establishments such as supermarkets, retail stores, etc., and in the embodiment shown herein the system utilizes a reel-to-reel, cassette or cartridge type tape player 1. The tape player 1 may either be continuously operating or may be selectively actuated by suitable timing and switching means so that the messages carried on the tape will be fed by audio signal into the system at predetermined timed intervals. The audio signals produced by the tape player, which are typically in the one thousand cycles per second range, may be either modulated for wave transmission or transmitted via a cable 2, such as existing commercially available telephone cables to a microwave transmitting station 3. The signal representing the message produced by the tape player is then transmitted via land based microwave channels 4 to a microwave receiving station 5.

In order to reach subscribers of the system who may be located great distances from the centrally located tape player, the signal will then be relayed via earth orbiting satelite. The satelite network consists of earth based transmitting and receiving stations, commonly referred to as "earth stations," and the orbiting satelite itself. In the embodiment shown herein, the signal received by the microwave receiving station 5 is fed to a first earth station 6 and beamed via its antenna 7 for upward transmission over a first frequency channel 8 to the satelite 9 and then over a second frequency channel 10 to a receiving earth station 12 via its antenna 11.

The type of satelite network described herein is a presently existing system owned and operated by Western Union under the Trademark WESTAR. The WESTAR system consists of two satelites known as WESTAR I and WESTAR II, each of which are spin stabilized synchronous, geostationary satelites. These satelites have a nominal altitude of 22,300 statute miles located over the equator between 90 and 135 west longitude.

Each satelite includes a communications repeater consisting essentially of twelve independent fixed gain amplifiers each having a bandwidth of 36 MHz. The transmitting earth station 6 transmits the desired signal over a 6 GHz frequency for upward transmission to the satelite. The satelite receivers translate the 6 GHz frequency carrier at a 4 GHz frequency carrier for downward transmission to the receiving earth station 12 which is located remote from the first earth station 6.

The existing WESTAR system includes numerous earth stations strategically located throughout the United States so that the signal transmitted by the first earth station 6, which may be located on the east coast of the United States, can be relayed to other earth stations on the west coast of the United States or at other points throughout the country. Each of the earth stations operated by the WESTAR system employs an uninterruptable power subsystem to protect against possible loss of primary power supplied by local electric companies.

Each spacecraft in the WESTAR system is provided with sufficient on-board station keeping propellant so that the expected useful life of each spacecraft is 10 years. Actual operating life will be limited by solar cell deterioration carried by each spacecraft and the availability of propellant fuel for control systems to continually maintain the spacecraft at its assigned orbital position.

After the signal is relayed by the satelite to the receiving earth station, it may be carried from there via land based microwave channels between microwave transmitting and receiving stations 13 and 14 respectively to local FM broadcasting stations such as 15, 16 for broadcast distribution to its subcarrier subscriber receivers. The signals may be carried between the microwave receiving stations and the FM stations via cables 20 or other suitable carrier means. While only two such local FM broadcast stations are shown in the embodiment herein, it will be appreciated that any number of local FM stations can be supplied with the signal for rebroadcast to subscriber receivers, depending upon the number of receivers involved and their particular location.

The particular messages which have been relayed via satelite to the various FM stations are then transmitted by these stations over subcarrier channels 17 or special sideband channels to the receivers 21, 22 equipped to receive such subcarrier channels. These will be located at the particular subscriber's establishment such as supermarkets, or other retail establishments for broadcast within the supermarket or store for in-store advertising, educational or instructional messages, music, or otherwise.

For broadcast of the advertising messages to locations regionally located with respect to the central tape player or located at distances not requiring satelite relay, the message can be transmitted by land based microwave channels direct from the tape player location to a receiving station 5' and then via cable 23 to local FM broadcast stations 18, 19 for transmission by the FM transmitter over subcarrier channels 17 to its subscribers 24, 25 respectively.

In this manner, a complete network may be established for broadcasting the same advertising message to thousands of subscriber receivers for in-store rebroadcast through the use of the combination of land based microwave channel transmission, to a select group of FM broadcast stations, and via satelite relay to additional FM broadcast stations located at points throughout the United States serviceable by satelite relay in order to avoid the disadvantages of land-line transmission. Accordingly, an advertiser can achieve nationwide coverage with a single advertising message at the particular point where the message will do most good, i.e. within physical reach of the product being advertised and at the moment of purchase.

The use of the system according to the present invention provides significant advantages in that it avoids the use of multiple line-of-sight repeater stations and switching centers. Additionally, use of satelite relay provides exceptional quality of transmission since the greatest portion of the transmission takes place in the vacuum of space, external of environmental atmospheric interference and does not pass through multiple failure prone switching equipment. Thus, space clean satelite voice channels are provided for high quality transmission. Additionally, satelite relay provides the facility of unlimited future expansion since long distance transmission is no longer a limitation on the use of the service.

Further, each FM broadcast station can be provided with multiplex equipment 27 for subdividing voice channels into two separate channels so that background music and the selected advertising messages can be transmitted simultaneously so that music can serve as a background while the message is being broadcast through the store or supermarket. Appropriate timing devices can be incorporated for injecting the commercial announcements while the background music is muted or silenced entirely.

Other systems for accomplishing the same effect are known, in which a first subcarrier source (such as for background music) is fed to a first subcarrier generator for modulation and then to the FM transmitter. Simultaneously, a second subcarrier source such as the source of the messages carried on the tape player is fed to a second subcarrier generator to modulate the second frequency signal and then to the transmitter for simultaneous transmission with the first frequency signal. Additionally, means may be provided for momentarily lowering the magnitude of the first frequency signal at selected intervals during broadcast of the second frequency signal, or silencing such first signal at such intervals.

While the presently existing satelite network contemplated for use in the present invention requires the use of earth stations for transmission and reception of the signals to and from the satelite, means for transmitting the signal over appropriate frequency carriers to the satelite could be accomodated at the location of the tape player so that intermediate transmission would be unnecessary. Similarly, the receiving earth station could be located at the local FM stations for broadcast of the signal to the subscriber receivers. This arrangement would also eliminate intermediate transmission networks such as microwave or cable carriers.

While the invention has been described and illustrated with respect to a certain embodiment which gives satisfactory results, it will be understood by those skilled in the art, after appreciating the purpose of the invention that various other changes and modifications may be made without departing from the spirit and scope of the invention, and it is therefore intended in the appended claims to cover all such changes and modifications.

What is claimed is:

1. An audio message broadcasting system comprising:
   - a source of pre-recorded audio messages and means for producing an audio signal corresponding to said messages;
   - a microwave transmitter connected to said source for transmitting said signal to an earth based transmitting station, and a microwave receiver connected to said earth based transmitting station so that said signal is transmitted from said source to said earth based transmitting station over land based microwave channels;
   - means at said earth based transmitting station for upwardly transmitting said signal over a first frequency channel to an earth orbiting spin stabilized geostationary satelite for receiving said signal and for translating said first frequency channel to a second frequency channel for downward relay transmission from said satelite;
   - an earth based receiving station remote from said earth based transmitting station for receiving said signal carried on said second frequency carrier;
   - a microwave transmitter connected to said earth based receiving station for transmitting said signal to an FM radio broadcasting station, and a microwave receiver connected to said FM station, so that said signal is transmitted from said earth based receiving station to said FM station over land based microwave channels; and
   - means for transmitting said signal over subcarrier frequency channels from said FM broadcasting station to subscriber receiving stations for audio broadcast of said prerecorded messages.

2. The audio message broadcasting system according to claim 1 wherein said first frequency channel is 6 GHz and wherein said second frequency channel is 4 GHz.

3. The audio message broadcasting system according to claim 1 further comprising first and second subcarrier generating means for simultaneously transmitting said signal carrying said audio message with a second signal for producing continuous program material.

4. The audio message broadcasting system according to claim 3 further comprising timed switching means for controlling the time interval of transmission of said signal at predetermined intervals without interrupting transmission of said second signal.

5. The audio message broadcasting system according to claim 1 wherein said source of pre-recorded audio messages is a tape player which produces an audio signal of about 1000 cycles per second.

6. A message broadcasting system comprising: a source of pre-recorded audio messages producing an audio signal corresponding thereto, a microwave transmitter connected to said source for modulating said signal and transmitting said signal over land based microwave channels to first and second microwave receiving stations, a first earth based station connected to said first microwave receiving station for transmitting said signal on a 6 GHz frequency carrier, an earth orbiting spin stabilized geostationary satelite receiving said signal on said 6 GHz carrier and translating said signal to a 4 GHz frequency carrier and transmitting said signal on said 4 GHz carrier to a second earth based station located remote from said first earth based station, microwave transmitting means connected to said second earth based station for transmitting the signal received thereby over land based microwave channels to a third microwave receiving station, a plurality of multiple modulated subcarrier broadcast transmission stations connected to said third microwave receiving station for transmitting said signal over subcarrier channels, and a plurality of subcarrier receivers located at subscriber stations for receiving and broadcasting said audio message, a plurality of FM radio broadcasting stations connected to said second microwave receiving station, multiple modulated subcarrier transmitter means at each of said plurality of FM stations for transmitting said signal over subcarrier channels to an additional plurality of subcarrier receiver stations for audio broadcast of said messages.

7. The message broadcasting system according to claim 6 wherein said source of pre-recorded audio messages is a tape player.

8. The message broadcasting system according to claim 7 wherein said signal produced by said source corresponds to an audio signal of about 1,000 cycles per second.

* * * * *